United States Patent
Hamamura et al.

(10) Patent No.: US 12,103,439 B2
(45) Date of Patent: Oct. 1, 2024

(54) MULTIPURPOSE VEHICLE

(71) Applicant: Kubota Corporation, Osaka (JP)

(72) Inventors: Kyouhei Hamamura, Sakai (JP);
Takahiro Miyasaka, Sakai (JP);
Tatsuya Yano, Sakai (JP)

(73) Assignee: Kubota Corporation, Osaka (JP)

( * ) Notice: Subject to any disclaimer, the term of this patent is extended or adjusted under 35 U.S.C. 154(b) by 467 days.

(21) Appl. No.: 17/349,295

(22) Filed: Jun. 16, 2021

(65) Prior Publication Data

US 2022/0219574 A1    Jul. 14, 2022

(30) Foreign Application Priority Data

Jan. 8, 2021    (JP) .................... 2021-002075

(51) Int. Cl.
   *B60N 2/14*    (2006.01)
   *B60N 2/02*    (2006.01)
   *B60N 2/20*    (2006.01)
   *B60R 21/13*   (2006.01)

(52) U.S. Cl.
   CPC .......... *B60N 2/146* (2013.01); *B60N 2/0292* (2013.01); *B60N 2/20* (2013.01); *B60N 2002/0216* (2013.01); *B60R 21/13* (2013.01)

(58) Field of Classification Search
   CPC ........ B60N 2/146; B60N 2/0292; B60N 2/20; B60N 2/14; B60N 2/933; B60N 2/943; B60N 2/245; B60N 2/38; B60N 2/062; B60N 2002/0216; B60N 2002/022; B60N 2/643; B60N 2/366; B60N 2/3011; B60N 2/22

USPC ............ 296/65.11, 65.06, 65.07; 297/344.24, 297/344.22
   See application file for complete search history.

(56) References Cited

U.S. PATENT DOCUMENTS

| | | | |
|---|---|---|---|
| 2,290,464 A * | 7/1942 | Buchheit ................. | B60N 2/04 296/65.09 |
| 3,874,626 A * | 4/1975 | Gross .................... | B60N 2/508 248/575 |
| 4,155,587 A * | 5/1979 | Mitchell ................ | B60N 2/245 5/81.1 R |
| 4,366,978 A * | 1/1983 | Hamatani .............. | B60N 2/366 296/37.16 |
| 5,042,864 A * | 8/1991 | Mochizuki ............. | B60N 2/14 248/416 |
| 5,524,952 A * | 6/1996 | Czech ................... | B60N 2/245 296/65.12 |

(Continued)

FOREIGN PATENT DOCUMENTS

| JP | 789382 A | 4/1995 |
|---|---|---|
| JP | 958307 A | 3/1997 |

(Continued)

*Primary Examiner* — Jason S Morrow
*Assistant Examiner* — Wenwei Zhuo
(74) *Attorney, Agent, or Firm* — The Webb Law Firm

(57) ABSTRACT

A multipurpose vehicle includes a vehicle body, an accommodating section (5) provided for the vehicle body and including a seat (20) in which an occupant is able to sit, and a changing mechanism (23) configured to change the horizontal orientation of the seat (20), wherein the changing mechanism (23) is configured to change the horizontal orientation of the seat so that the seat faces at least a predetermined first direction d1 or a predetermined second direction d2.

10 Claims, 8 Drawing Sheets

(56) References Cited

U.S. PATENT DOCUMENTS

| | | | | |
|---|---|---|---|---|
| 5,769,480 A * | 6/1998 | Gebhardt | ............... | B60N 2/245 |
| | | | | 414/522 |
| 6,024,398 A * | 2/2000 | Horton | ................... | B60N 2/14 |
| | | | | 296/65.11 |
| 6,572,172 B1 * | 6/2003 | Ninomiya | ............... | B60N 2/14 |
| | | | | 297/344.23 |
| 7,036,884 B2 * | 5/2006 | Becker | ................... | B60N 2/36 |
| | | | | 297/235 |
| 7,334,829 B2 * | 2/2008 | Fukui | ................... | B60N 2/0745 |
| | | | | 296/65.11 |
| 7,648,186 B2 * | 1/2010 | Ukai | ................... | B60N 2/146 |
| | | | | 297/344.22 |
| 7,845,703 B2 * | 12/2010 | Panzarella | ............. | A61G 3/062 |
| | | | | 296/65.11 |
| 9,016,797 B2 * | 4/2015 | Iida | ................... | B60N 2/245 |
| | | | | 297/344.24 |
| 10,518,670 B1 * | 12/2019 | Olufemi-Jones | ...... | B60N 2/753 |
| 2001/0038223 A1 * | 11/2001 | Suga | ................... | B60N 2/146 |
| | | | | 296/65.11 |
| 2003/0218370 A1 * | 11/2003 | Langham | ............... | A47C 9/025 |
| | | | | 297/344.22 |
| 2008/0224522 A1 * | 9/2008 | Taguchi | ................... | B60N 2/06 |
| | | | | 297/344.21 |
| 2010/0084537 A1 * | 4/2010 | Lin | ................... | B60N 2/146 |
| | | | | 248/418 |
| 2011/0175411 A1 * | 7/2011 | Wagner | ................... | B60N 2/3011 |
| | | | | 297/354.1 |
| 2011/0193390 A1 * | 8/2011 | Hsiao | ................... | B60N 2/146 |
| | | | | 297/344.22 |
| 2016/0090057 A1 | 3/2016 | Hirooka et al. | | |
| 2016/0185258 A1 * | 6/2016 | Carr | ................... | B60J 5/0473 |
| | | | | 296/65.12 |

FOREIGN PATENT DOCUMENTS

| | | | | |
|---|---|---|---|---|
| JP | 201668803 A | 5/2016 | | |
| WO | WO-2005122990 A1 * | 12/2005 | ............... | A61G 3/02 |
| WO | 2010044174 A1 | 4/2010 | | |

* cited by examiner

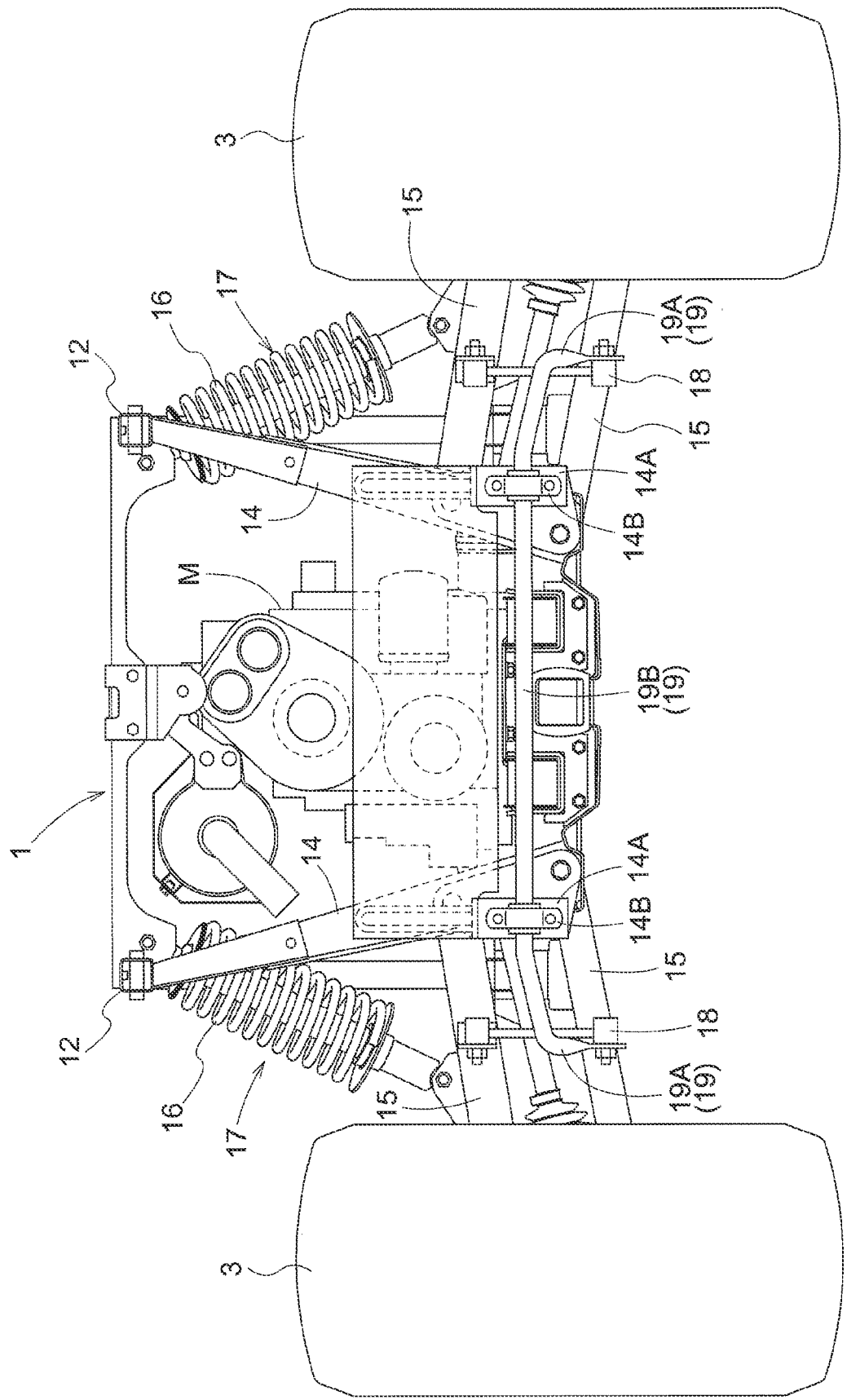

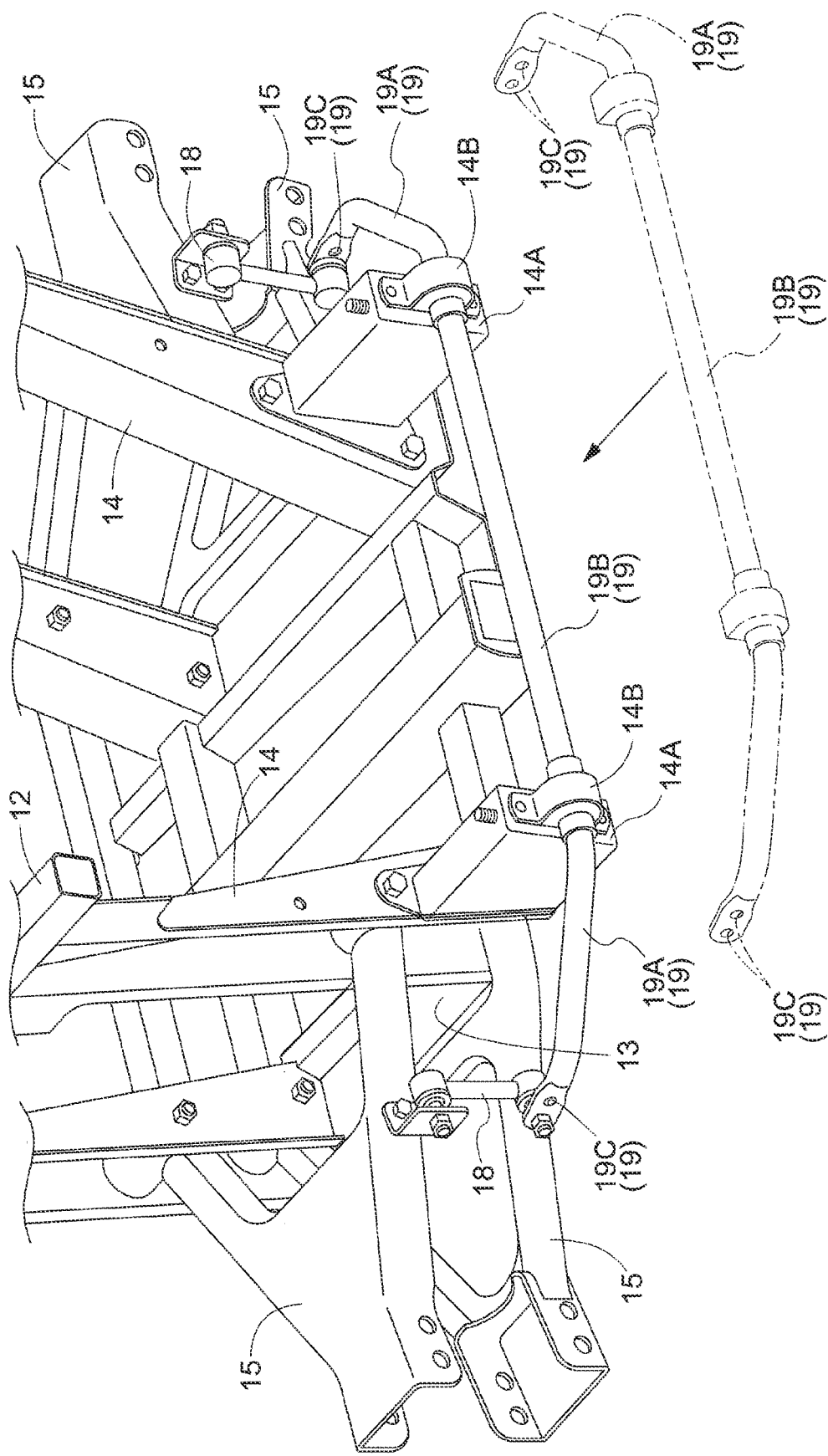

MULTIPURPOSE VEHICLE

CROSS REFERENCE TO RELATED APPLICATION

This application claims priority to Japanese Patent Application No. 2021-002075 filed Jan. 8, 2021, the disclosure of which is hereby incorporated by reference in its entirety.

BACKGROUND OF THE INVENTION

Field of the Invention

The present invention relates to a multipurpose vehicle.

Description of Related Art

Typical multipurpose vehicles have had a seat installed such that the occupant constantly faces forward in the travel direction as disclosed in Japanese Unexamined Patent Application Publication, Tokukai, No. 2016-068803.

SUMMARY OF THE INVENTION

With conventional art, getting in and out of a multipurpose vehicle has been difficult for a person who requires assistance in doing so such as an elderly person.

In view of the above issue, the present invention has an object of providing a multipurpose vehicle easy to get in and out of.

A multipurpose vehicle of the present invention includes: a vehicle body; an accommodating section provided for the vehicle body and including a seat in which an occupant is able to sit; and a changing mechanism configured to change a horizontal orientation of the seat, wherein the changing mechanism is configured to change the horizontal orientation of the seat so that the seat faces at least a predetermined first direction or a predetermined second direction.

The above arrangement allows the orientation of the seat to be changed from the direction that the seat faces while the vehicle is traveling. This in turn allows a person to get in or out of the multipurpose vehicle easily.

A multipurpose vehicle of the present invention may preferably be arranged such that the changing mechanism includes a rotating mechanism configured to support the seat in such a manner that the seat is rotatable between the first direction and the second direction and a fixing mechanism configured to fix the seat while the seat faces the first direction or the second direction.

The above arrangement allows the orientation of the seat to be changed through simple rotation of the seat between the first direction and the second direction. The above arrangement also allows the seat to be fixed in the first direction or the second direction. This allows a person to stably sit in the seat and stably get in and out of the multipurpose vehicle.

A multipurpose vehicle of the present invention may preferably be arranged such that the rotating mechanism is present under the seat and includes a rotary shaft rotatable about a rotation axis extending in an up-down direction of the vehicle body.

The above arrangement involves a rotating shaft simply provided under the seat to allow the seat to be rotated between the first direction and the second direction.

A multipurpose vehicle of the present invention may preferably be arranged such that the rotating mechanism includes an urging mechanism urging the seat in a rotation direction from the second direction to the first direction.

The above arrangement allows a person getting in or out of the multipurpose vehicle, as well as an assistant who assists the person to do so, to change the orientation of the seat from the second direction to the first direction without manually changing the orientation of the seat. This allows the person to get in and out of the multipurpose vehicle easily.

A multipurpose vehicle of the present invention may preferably be arranged such that the fixing mechanism includes a fixing operation tool manually operable to switch the seat between a fixed state and an unfixed state, and the fixing operation tool is present at a laterally outer portion of the vehicle body both when the seat faces the first direction and when the seat faces the second direction.

With the above arrangement, in a case where an assistant who assists a person to get in or out of the multipurpose vehicle is to manually change the orientation of the seat, the fixing operation tool is easily reachable (that is, at a laterally outer portion of the vehicle body) no matter whether the seat faces the first direction or the second direction. This allows the assistant to easily operate the fixing operation tool.

A multipurpose vehicle of the present invention may preferably be arranged such that the fixing mechanism is further configured to fix the seat while the seat faces a third direction between the first direction and the second direction.

The above arrangement allows the operation of changing of the orientation of the seat to be suspended in a third direction between the first direction and the second direction when the orientation of the seat is changed between the first direction and the second direction. The above arrangement allows a person to get in or out of the multipurpose vehicle while the seat faces the third direction and then allows the seat to return to the first direction or the second direction. This shortens the time period necessary to change the orientation of the seat when a person gets in or out of the multipurpose vehicle. Further, an occupant may need to, when changing the orientation of the seat to the first direction or the second direction, suspend the operation of the orientation change and do something such as correcting his/her posture. In such a case, the occupant can suspend the operation of changing the orientation of the seat in the third direction to do it.

A multipurpose vehicle of the present invention may preferably be arranged such that the first direction is a front direction of the vehicle body, and the second direction is a laterally outward direction of the vehicle body.

The above arrangement allows a person who wants to get in the multipurpose vehicle to orient the seat so that the seat faces a laterally outward direction. This allows the person, who is standing on the laterally outward side of the vehicle, to directly sit in the seat. The person can then keep the orientation of the seat so that the seat faces forward (that is, the direction in which the vehicle will travel) while the vehicle is traveling. Further, the occupant can simply perform the above operation in the reversed order when getting out of the multipurpose vehicle. The above arrangement thus allows a person to get in and out of the multipurpose vehicle easily.

A multipurpose vehicle of the present invention may preferably be arranged such that while the seat faces the second direction, the seat is switchable between (i) a protruding state, in which the seat protrudes from the vehicle body laterally outward, and (ii) a retracted state, in which the seat is retracted in the vehicle body.

In a case where the vehicle is provided with, for example, a roll-over protective structure (ROPS) or a roof, a person who wants to get in or out of the multipurpose vehicle may need to bend forward to avoid bumping on the ROPS or the like. The above arrangement, which allows the seat to protrude, eliminates the need for such a person to bend forward. The above arrangement also allows an occupant in the seat to switch the seat between the retracted state and the protruding state, and thus allows the occupant to move himself/herself to the inside or outside of the vehicle. The above arrangement thereby allows a person to get in and out of the multipurpose vehicle easily, and also allows an assistant who assists a person to get in or out of the multipurpose vehicle to easily assist the person to do so.

A multipurpose vehicle of the present invention may preferably further include: a roll-over protective structure around the accommodating section, wherein the seat includes a seat section and a backrest section, the seat is switchable between (i) a used state, in which the backrest section is present behind the seat section, and (ii) an unused state, in which the backrest section lies over the seat section so that a backrest surface of the backrest section faces the seat section, and when the seat is in the unused state, the backrest section covers the seat section entirely in a plan view.

With the above arrangement, switching the seat to the unused state causes (i) the backrest surface of the backrest section to face downward and (ii) the backrest section to cover the seat section. This prevents the seat section and the backrest surface from becoming dirty due to, for example, rain water or dust, and also prevents the seat surface and the backrest section from becoming degraded by sunlight.

A multipurpose vehicle of the present invention may preferably be arranged such that the seat includes a state switching mechanism configured to switch the seat between the used state and the unused state, and the state switching mechanism includes a state switching operation tool manually operable to switch the seat from the used state to the unused state.

The above arrangement allows a person to simply operate the state switching operation tool to switch the seat between the used state and the unused state.

A multipurpose vehicle of the present invention may preferably be arranged such that the state switching mechanism includes a connecting member for the backrest section, a rotation supporting member present at a back portion of the seat section and supporting the connecting member in such a manner that the connecting member is rotatable, and a rotary shaft present behind the seat section and rotatable about a rotation axis extending in a width direction of the seat.

With the above arrangement, the seat section and the backrest section are connected to each other and supported by a connecting member, which is in turn supported by a rotation supporting member in such a manner that the connecting member is rotatable. This simple structure allows the seat to be switched between the used state and the unused state.

A multipurpose vehicle of the present invention may preferably be arranged such that when the seat is in the unused state, the backrest section is in contact with a seat surface of the seat section.

With the above arrangement, the backrest surface of the backrest section is in contact with the seating surface of the seat section in the unused state. This prevents rain water from easily seeping between the backrest surface and the seat surface. The above arrangement thereby prevents, for example, rain water from wetting the backrest surface and the seat surface, which an occupant's body touches when he or she sits in the seat.

BRIEF DESCRIPTION OF THE DRAWINGS

FIG. 7 is a rear view of a multipurpose vehicle.
FIG. 8 is a view of a stabilizer, illustrating its configuration.

DETAILED DESCRIPTION OF THE PREFERRED EMBODIMENTS

The description below deals with an embodiment of the present invention with reference to drawings.

[Overall Configuration of Multipurpose Vehicle]

The description below of the vehicle body of a multipurpose vehicle (utility vehicle) refers to FIGS. 1 and 2, which show arrow F to indicate the forward direction of the vehicle body, arrow B to indicate the backward direction of the vehicle body, arrow R to indicate the rightward direction of the vehicle body, arrow L to indicate the leftward direction of the vehicle body, arrow U to indicate the upward direction of the vehicle body, and arrow D to indicate the downward direction of the vehicle body.

Figure 1:
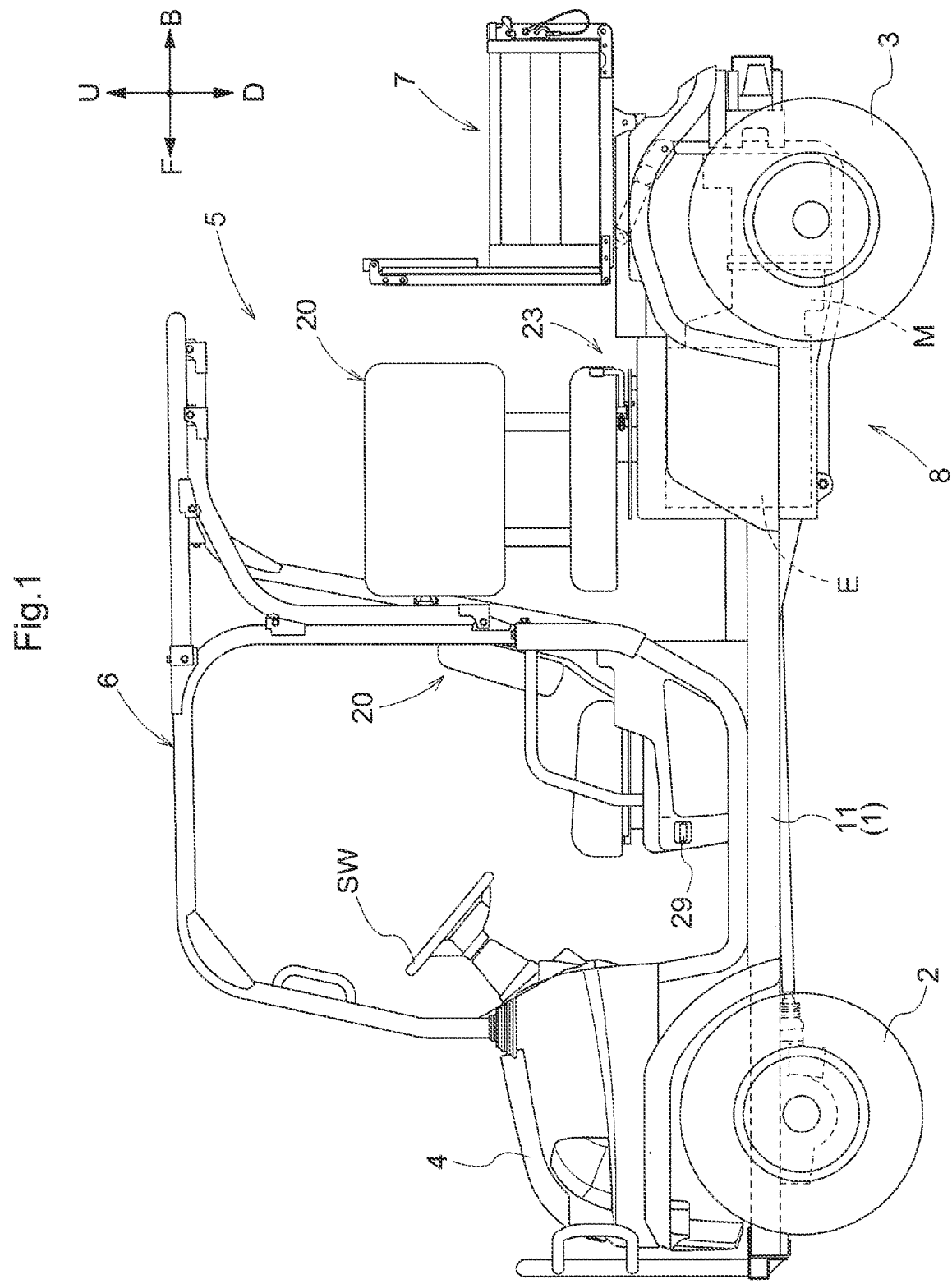
FIG. 1 is a side view of a multipurpose vehicle as a whole.

As illustrated in FIG. 1, the multipurpose vehicle includes a vehicle body including a vehicle body frame 1 as a combination of, for example, tube frame members, a pair of left and right drivable front wheels 2 present at a front portion of the vehicle body in such a manner that their direction is changeable, and a pair of left and right drivable rear wheels 3 present at a back portion of the vehicle body. The multipurpose vehicle further includes a front cover 4 at a front end portion of the vehicle body, an accommodating section 5 present behind the front cover 4 and configured to accommodate occupants, a roll-over protective structure (ROPS) 6 around the accommodating section 5, a truck box 7 behind the accommodating section 5, and a drive section 8 present below the truck box 7 and including an engine E as a drive source and a travel transmission device M.

[Configuration of Vehicle Body Frame]

As illustrated in FIGS. 1, 7, and 8, the vehicle body frame 1 includes left and right main frames 11 extending in the front-back direction, upper frames 12 over the main frames 11, mount frames 13 present in the drive section 8 and under the upper frames 12, and four vertical frames 14, two of which connect the left mount frame 13 to the left upper frame 12 and the other two of which connect the right mount frame 13 to the right upper frame 12.

The left and right pairs of vertical frames 14 are each connected to a pair of upper and lower rear suspension arms 15 supporting one of the rear wheels 3. The rearward ones of the left and right vertical frames 14 each have a back surface with a lower portion provided with a block member 14A detachably attached thereto with use of bolts. The pair of block members 14A each have a back surface provided with a holder 14B detachably attached thereto with use of bolts.

The rear suspension arms 15 are each supported by the corresponding ones of the vertical frames 14 in such a manner as to be swingable about a front-back swing axis. The upper ones of the rear suspension arms 15 each support a lower end of a rear suspension unit 17 including a rear suspension spring 16 configured to become compressed by an upward swing of the corresponding rear suspension arms 15.

The upper ones of the upper and lower rear suspension arms 15 are provided with respective links 18, and are connected via the links 18 to opposite ends of a rod-shaped stabilizer 19. The stabilizer 19 includes an intermediate portion 19B behind the respective back surfaces of the rearward ones of the left and right vertical frames 14. In addition to the rod-shaped intermediate portion 19B, the stabilizer 19 includes at each of its opposite ends an arm portion 19A bent toward the front side. The intermediate portion 19B of the stabilizer 19 is supported by the rearward vertical frames 14 via the respective block members 14A in such a manner as to be capable of becoming twisted by means of the pair of holders 14B in a horizontal orientation. In a case where one of the left and right rear wheels 3 has received an external force that will move the rear wheel 3 up and down, the above-described rear suspension units 17 and the torsional rigidity of the stabilizer 19 prevent the rear wheel 3 from being moved up and down sharply.

As illustrated in FIG. 8, the left and right arm portions 19A of the stabilizer 19 each have two attachment holes 19C. A fastening bolt is inserted through one of the attachment holes 19C, and is fastened in a fastening hole in the corresponding link 18. When the stabilizer 19 is to be attached to the links 18, one of the two attachment holes 19C is selected for the insertion of a fastening bolt to adjust the torsional rigidity. The stabilizer 19 and the links 18 can be designed to allow the torsional rigidity to be adjusted appropriately by selecting an attachment hole 19C for the insertion of a fastening bolt. Further, according to the preferences of an occupant, or in a case where the torsional rigidity of the stabilizer 19 should be changed in view of the condition of the travel surface, simply pulling off the fastening bolt and inserting it into the other attachment hole 19C can change the torsional rigidity. The description above has dealt with a stabilizer 19 for preventing the rear wheels 3 from being moved up and down sharply. The multipurpose vehicle includes a similar element for the front wheels 2 as well.

[Configuration of Accommodating Section]

Figure 2:
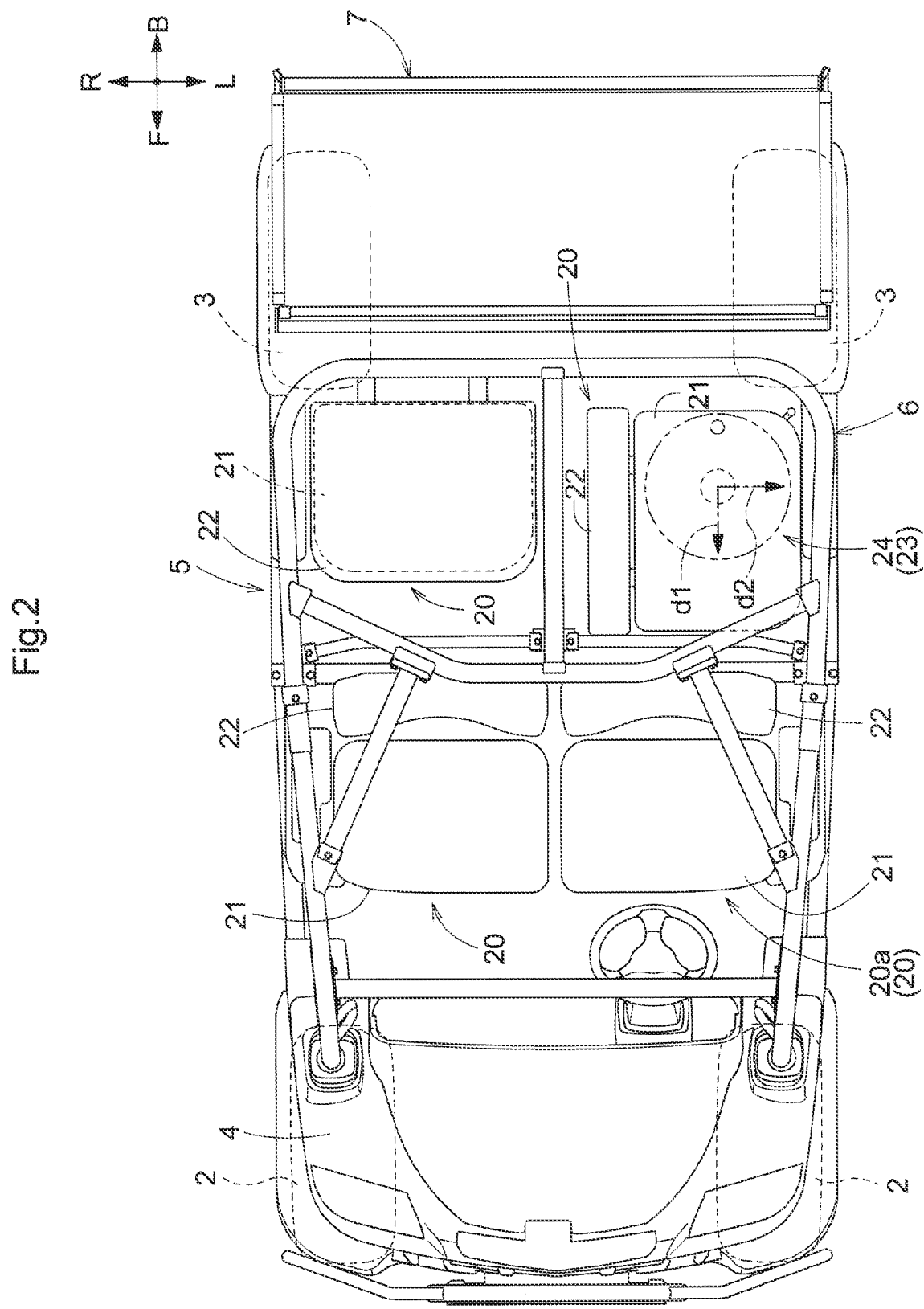
FIG. 2 is a plan view of a multipurpose vehicle as a whole.

As illustrated in FIGS. 1 and 2, the accommodating section 5 includes four seats 20 and a steering wheel SW configured to change the direction of the front wheels 2. The present embodiment is arranged such that the four seats 20 include a driver's seat 20a to the left on the front row of the accommodating section 5 and behind the steering wheel SW.

[Configuration of Changing Mechanism]

As illustrated in FIG. 1, the four seats 20 include at least one seat 20 provided with a changing mechanism 23 configured to change the horizontal orientation of the seat 20. This allows the orientation of the seat 20 to be changed between (i) a front direction d1 (that is, the "first direction" for the present invention) relative to the front-back direction of the vehicle body and (ii) a laterally outward direction d2 (that is, the "second direction" for the present invention) relative to the front-back direction of the vehicle body. The description below deals with an example in which the changing mechanism 23 is provided for that one of the four seats 20 which is to the left on the back row of the accommodating section 5.

Figure 3:
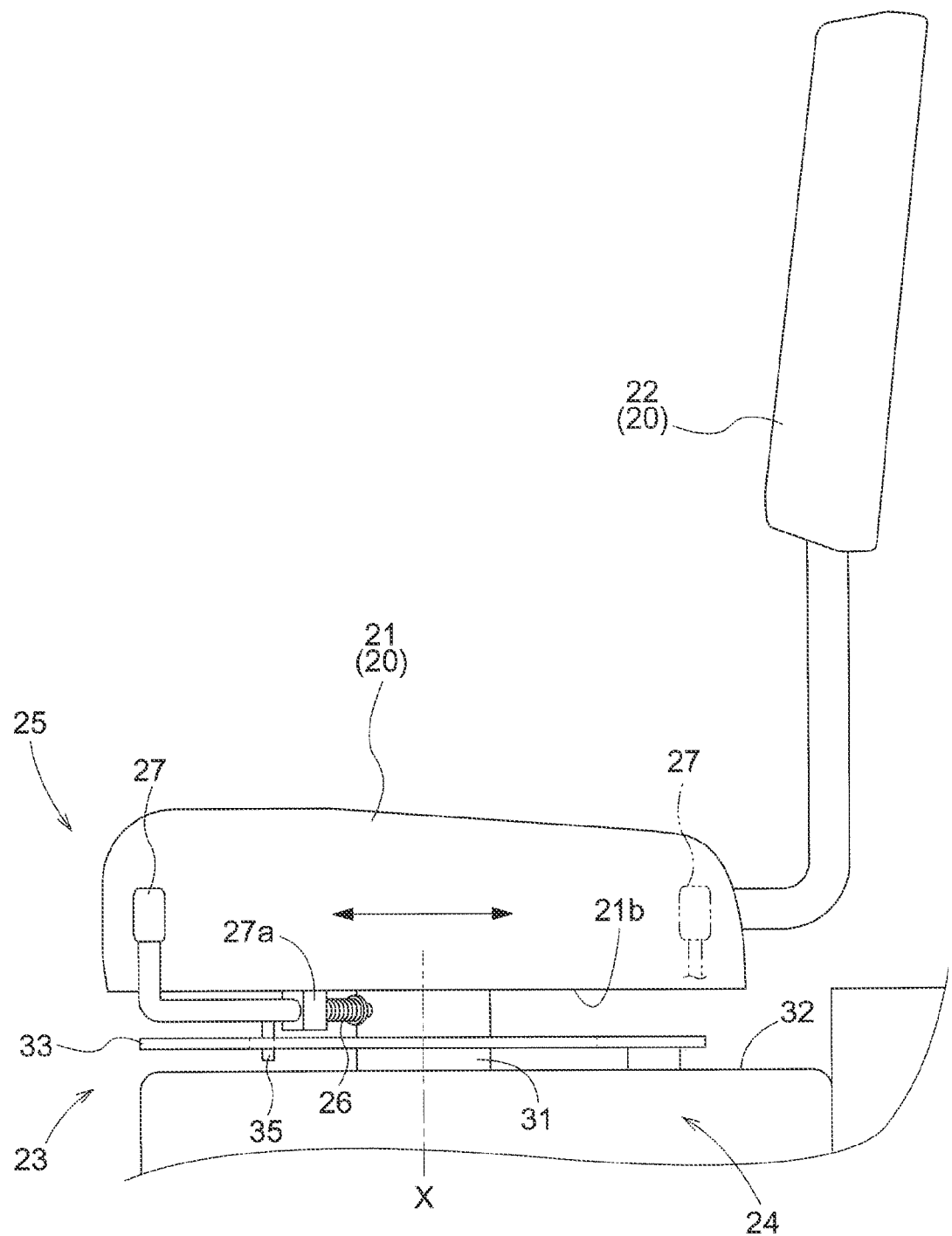
FIG. 3 is a side view of a seat.

As illustrated in FIGS. 2 and 3, each seat 20 includes a seat section 21 and a backrest section 22. The changing mechanism 23 includes (i) a rotating mechanism 24 configured to support the corresponding seat 20 in such a manner that the seat 20 is rotatable and (ii) a fixing mechanism 25 configured to fix the seat 20 as it faces the front direction d1 or the laterally outward direction d2.

Figure 4:
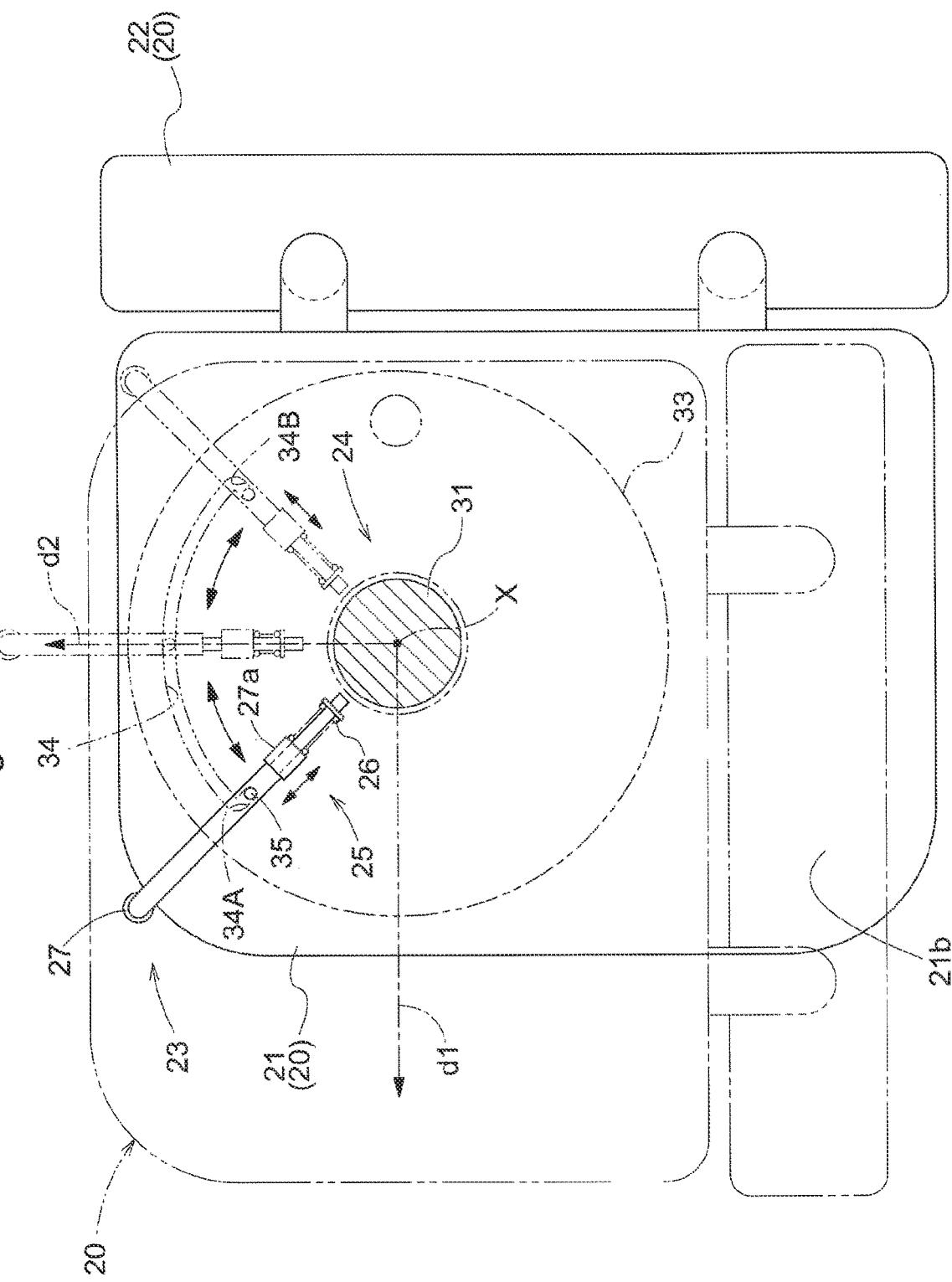
FIG. 4 is a bottom view of a state switching mechanism.

As illustrated in FIGS. 3 and 4, the rotating mechanism 24 is present on a lower surface 21b of the corresponding seat section 21, and includes a rotary shaft 31 rotatable about a rotation axis X extending in the up-down direction of the vehicle body. The rotary shaft 31 is supported by an upper surface of a back seat supporting member 32 supported by the vehicle body frame 1. The seat 20 is supported by the back seat supporting member 32 via the rotary shaft 31 in such a manner as to be rotatable about the rotation axis X.

The fixing mechanism 25 includes (i) a plate-shaped member 33, (ii) an engagement groove 34 present in the plate-shaped member 33 and having a fixing portion 34A and a fixing portion 34B, (iii) a lock pin 35 supported by the seat section 21 and configured to become engaged with and disengaged from the fixing portion 34A or 34B, and (iv) a fixing operation tool 27 manually operable to move the lock pin 35 horizontally.

The fixing operation tool 27 is supported by a supporting member 27a on the lower surface 21b of the seat section 21 in such a manner as to be movable horizontally. The fixing operation tool 27 extends above the engagement groove 34 from near the rotary shaft 31 in a direction away from the rotation axis X. The fixing operation tool 27 has an upwardly bent portion at a far end in the extension direction. The fixing operation tool 27 is provided with the lock pin 35 at a position corresponding to the engagement groove 34. The fixing operation tool 27 is provided with a fixing urging mechanism 26 urging the fixing operation tool 27 toward the rotation axis X.

The plate-shaped member 33 is fixed to and supported by the back seat supporting member 32. Changing the orientation of the seat 20 does not change the orientation of the plate-shaped member 33.

The engagement groove 34 is present in the plate-shaped member 33 in the shape of a circular arc with the rotation axis X as the center. The engagement groove 34 has fixing portions 34A and 34B at respective opposite ends. The fixing portions 34A and 34B extend from the respective opposite ends of the engagement groove 34 toward the rotation axis X.

The lock pin 35 protrudes downward from the fixing operation tool 27. The lock pin 35 has a lower end portion that is constantly in the engagement groove 34 and that is moved along the engagement groove 34 as the seat 20 is rotated. Changing the orientation of the seat 20 to place the lock pin 35 at either one of the opposite ends of the engagement groove 34 causes the lock pin 35 to be hooked into the corresponding one of the fixing portions 34A and 34B due to the urging force of the fixing urging mechanism 26.

The fixing portions 34A and 34B each receive the lock pin 35 when the seat 20 is oriented to face the front direction d1 or the laterally outward direction d2, respectively. With the lock pin 35 hooked in either of the fixing portions 34A and 34B, the seat 20 is fixed to face the corresponding one of the front direction d1 and the laterally outward direction d2. When an operator moves the fixing operation tool 27 away from the rotation axis X against the urging force of the fixing urging mechanism 26, the lock pin 35 is pulled out of the fixing portion 34A or 34B, so that the seat 20 becomes unfixed.

While the orientation of the seat 20 is changed between the front direction d1 and the laterally outward direction d2, the lock pin 35 remains in the engagement groove 34 as it is moved between the fixing portions 34A and 34B. In other words, the engagement groove 34 restricts how the orientation of the seat 20 can be changed: the orientation is changeable only between the front direction d1 and the laterally outward direction d2.

When the seat 20 faces the front direction d1, the fixing operation tool 27 is oriented to extend in the front-left direction of the vehicle body. Changing the orientation of the seat 20 also changes the orientation of the fixing operation tool 27. When the seat 20 faces the laterally outward direction d2, the fixing operation tool 27 is oriented to extend in the back-left direction of the vehicle body. With this arrangement, the fixing operation tool 27 is present at a laterally outer portion of the vehicle body both when the seat 20 faces the front direction d1 and when the seat 20 faces the laterally outward direction d2.

[Configuration of State Switching Mechanism]

Figure 5:
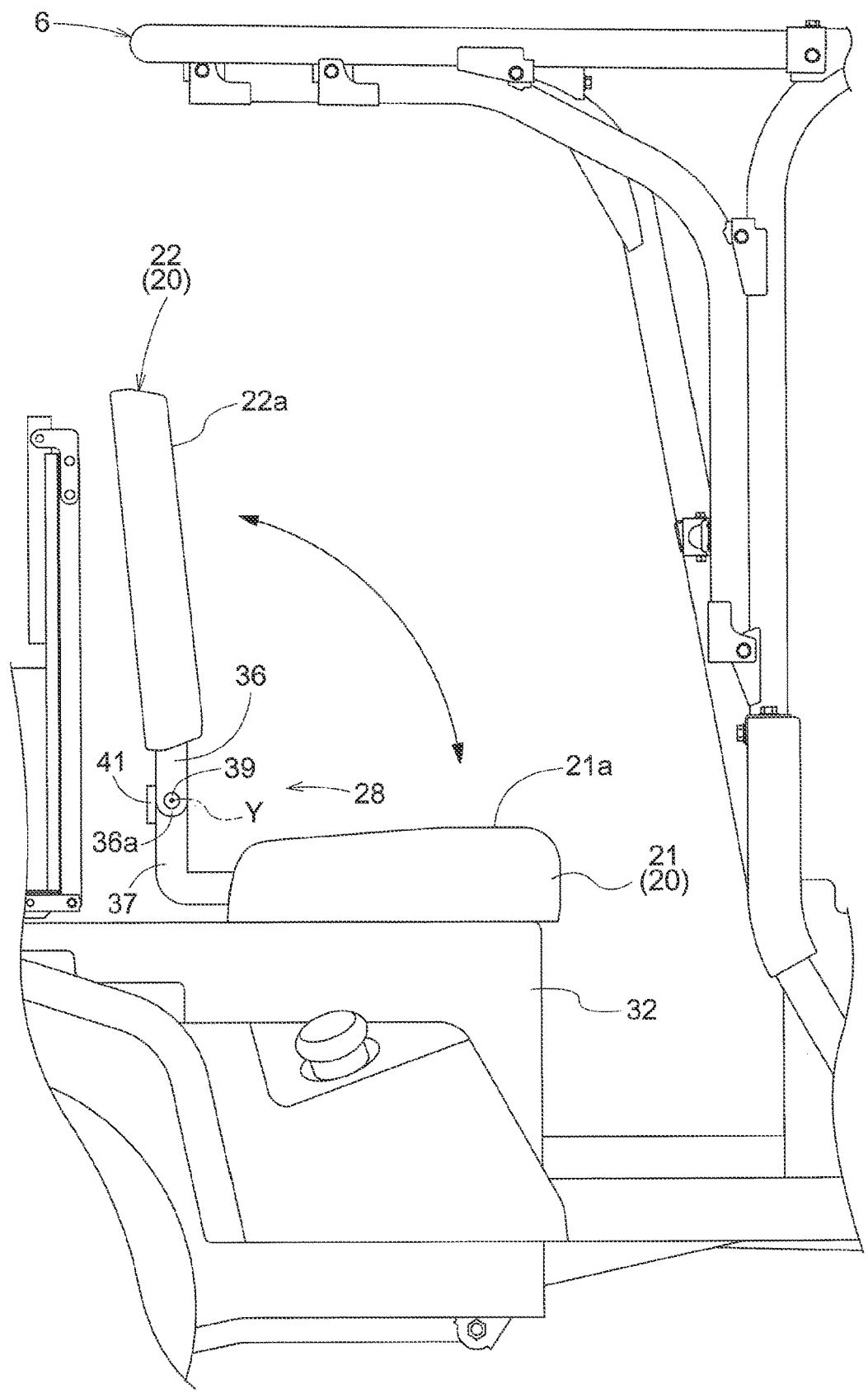
FIG. 5 is a side view of a state switching mechanism in the used state.
Figure 6:
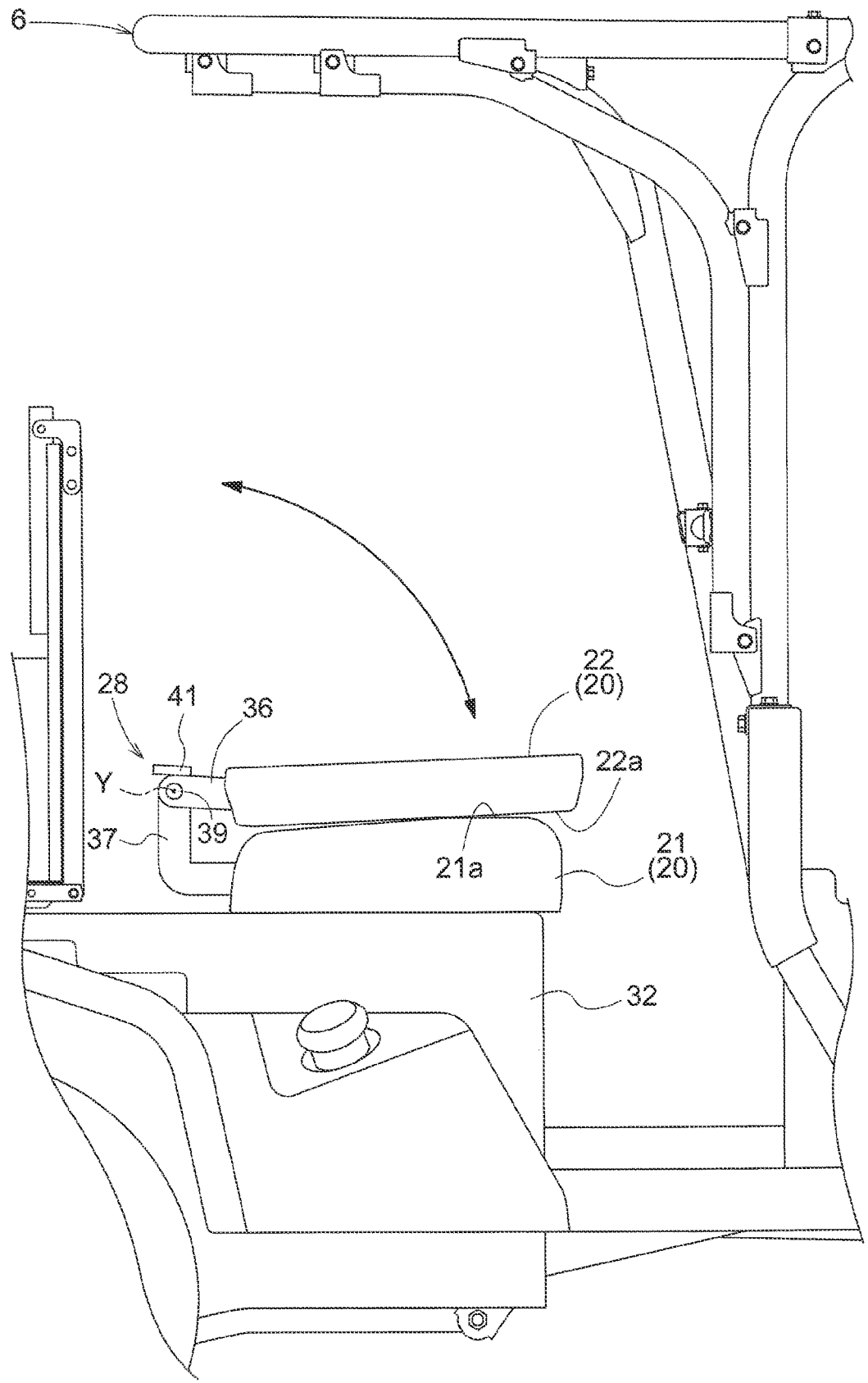
FIG. 6 is a side view of a state switching mechanism in the unused state.

As illustrated in FIGS. 2, 5, and 6, each seat 20 includes state switching mechanisms 28 that allow the seat 20 to be switched between (i) a used state, in which the backrest section 22 stands behind the seat section 21, and (ii) an unused state, in which the backrest section 22 lies over the seat section 21 so that the seat surface 21a of the seat section 21 faces the backrest surface 22a of the backrest section 22. The state switching mechanisms 28 connect the seat section 21 and the backrest section 22. The description below deals with that one of the four seats 20 which is to the right on the back row of the accommodating section 5. The other seats 20 each include similar mechanisms.

The state switching mechanisms 28 extend between the seat section 21 and the backrest section 22. The state switching mechanisms 28 are present in the number of two at respective positions, and are arranged next to each other in the width direction of the seat 20. The state switching mechanisms 28 each include a connecting member 36 for the backrest section 22, a rotation supporting member 37 present at a back portion of the seat section 21 and supporting the connecting member 36 in such a manner that the connecting member 36 is rotatable, and a rotary shaft 39.

The rotation supporting member 37 extends backward of the seat 20, and has an upwardly bent portion at a far end in the extension direction.

In the used state, the connecting member 36 is oriented to extend downward of the backrest section 22, and has a lower end portion 36a supported by the rotation supporting member 37 in such a manner that the connecting member 36 is rotatable about a rotation axis Y of the rotary shaft 39, which extends in the width direction of the seat 20.

The connecting member 36 is provided with a restricting member 41 that is, in the used state, present behind the rotary shaft 39 in such a manner as to protrude downward from the connecting member 36. The restricting member 41 is a plate-shaped member. In the used state, the restricting member 41 is in contact with the rotation supporting member 37 to restrict the rotation of the connecting member 36 to prevent the backrest section 22 in the used state from becoming further inclined backward.

As illustrated in FIG. 2, the seat surface 21a has an edge portion that is, in the unused state, inward of the edge portion of the backrest surface 22a in a plan view. In other words, the backrest surface 22a is larger in area than the seat surface 21a, and in the unused state, the backrest section 22 covers the entire seat section 21 in a plan view.

The driver's seat 20a is provided with, at a laterally outer portion thereof, a state switching operation tool 29 manually operable to switch the seat 20 from the used state to the unused state. Operating the state switching operation tool 29 switches all the seats 20 from the used state to the unused state (details omitted).

Alternative Embodiments

The description below deals with example alternatives to the embodiment described above. The variations described below may be combined with one another to be applied to the embodiment described above as long as such combination causes no contradiction. The present invention is not limited in scope to the embodiments described herein.

(1) The embodiment described above is an example in which the four seats 20 include a seat 20 to the left on the back row of the accommodating section 5 which seat 20 is provided with the changing mechanism 23. The present invention is, however, not limited to such an embodiment. The seats 20 of the accommodating section 5 include at least one seat 20 provided with the changing mechanism 23: the seats 20 may each be provided with the changing mechanism 23.

(2) The embodiment described above may be altered such that the rotating mechanism 24 includes an urging mechanism urging the corresponding seat 20 in a rotation direction from the laterally outward direction d2 to the front direction d1. The urging mechanism may alternatively urge the seat 20 in the opposite rotation direction, that is, in a rotation direction from the front direction d1 to the laterally outward direction d2. The urging mechanism may further alternatively urge the seat 20 in each rotation direction.

(3) The rotating mechanism 24 may include a driving device such as an electric motor and be drivable through operation of the driving device with use of an operation device to change the orientation of the corresponding seat 20 between the front direction d1 and the laterally outward direction d2.

(4) The embodiment described above may be altered such that the fixing mechanism 25 is further capable of fixing the corresponding seat 20 as it faces a third direction between the front direction d1 and the laterally outward direction d2. The engagement groove 34 will, in this case, have not only the fixing portions 34A and 34B but also another fixing portion corresponding to the third direction.

(5) The embodiment described above may be altered such that with a seat 20 facing the laterally outward direction d2, the seat 20 is switchable between (i) a protruding state, in which the seat 20 protrudes from the vehicle body laterally outward, and (ii) a retracted state, in which the seat 20 is retracted in the vehicle body.

(6) The embodiment described above is an example in which the changing mechanism 23 includes a rotary shaft 31 rotatable about a rotation axis X extending in the up-down direction of the vehicle body. The present invention is, however, not limited to such an embodiment. The embodiment may be altered, for instance, such that a seat 20 is provided with wheels on the lower surface 21b of the seat section 21, that the back seat supporting member 32 is provided with rails each in the shape of a circle in a plan view, and that the orientation of the seat 20 can be changed as the wheels roll along the rails.

(7) The embodiment described above is an example in which the four seats 20 include a seat 20 to the left on the back row of the accommodating section 5 which seat 20 is provided with the changing mechanism 23. The present invention is, however, not limited to such an embodiment. The seats 20 of the accommodating section 5 include at least one seat 20 provided with the changing mechanism 23: the seats 20 may each be provided with the changing mechanism 23.

(8) The embodiment described above is an example in which the fixing mechanism 25 includes an engagement groove 34 with fixing portions 34A and 34B and a lock pin 35. The present invention is, however, not limited to such an embodiment. The fixing mechanism 25 serves simply to fix the corresponding seat 20 in a particular direction. The fixing mechanism 25 may, for instance, include a stopping mechanism configured to stop the rotation of the rotary shaft 31, and be operated with use of the fixing operation tool 27 for the stopping mechanism to stop the rotation of the rotary shaft 31 and thereby fix the seat 20 in the front direction d1 or the laterally outward direction d2. Further, the fixing mechanism 25 may be altered to fix the seat 20 in any direction rather than in the front direction d1 or the laterally outward direction d2.

(9) The embodiment described above is an example in which the connecting member 36 is supported by the rotation supporting member 37 in such a manner as to be rotatable about the rotation axis Y. The present invention is, however, not limited to such an embodiment. The connecting member 36 may, for instance, be supported by the rotation supporting member 37 in such a manner as to be not only rotatable about the rotation axis Y but also moveable in the up-down direction and front-back direction of the vehicle body relative to the rotation supporting member 37.

(10) The embodiment described above is an example in which the state switching operation tool 29 is manually operable to switch all the seats 20 from the used state to the unused state. The present invention is, however, not limited to such an embodiment. The state switching operation tool 29 may, for instance, have the function of switching the seats 20 from the unused state to the used state. Further, each of the seats 20 may be provided with a dedicated state switching operation tool 29.

(11) The state switching operation tool 29 may be omitted. In this case, an occupant directly moves the backrest section 22 to switch the seat 20 between the used state and the unused state.

(12) The state switching mechanisms 28 may include an urging mechanism extending between the connecting member 36 and the rotation supporting member 37 and configured to switch the corresponding seat 20 from the used state to the unused state or from the unused state to the used state. Further, the state switching mechanisms 28 may include a lock mechanism configured to lock the connecting member 36 and the rotation supporting member 37 in either of the used state and the unused state.

(13) A seat 20 may include only one state switching operation tool 29 at a position, or three or more state switching operation tools 29 at respective positions.

(14) The embodiment described above is an example in which both the front wheels 2 and the rear wheels 3 are each provided with a stabilizer 19 to prevent the corresponding wheels from being moved up and down sharply. The present invention is, however, not limited to such an embodiment. The stabilizer 19 may, for instance, be provided for only either the front wheels 2 or the rear wheels 3.

INDUSTRIAL APPLICABILITY

The present invention is applicable to multipurpose vehicles.

REFERENCE SIGNS LIST

5 Accommodating section
6 ROPS
20 Seat
21 Seat section
21a Seat surface
22 Backrest section
22a Backrest surface
23 Changing mechanism
24 Rotating mechanism
25 Fixing mechanism
27 Fixing operation tool
27a Supporting member
28 State switching mechanism
29 Rotary shaft
31 Connecting member
36 Rotation supporting member
X Rotation axis
d1 Front direction (first direction)
d2 Laterally outward direction (second direction)

The invention claimed is:

1. A multipurpose vehicle, comprising:
a vehicle body;
an accommodating section provided for the vehicle body and comprising a seat in which an occupant is able to sit; and
a changing mechanism configured to change a horizontal orientation of the seat,
wherein:
the changing mechanism is configured to change the horizontal orientation of the seat so that the seat faces at least a first direction or a second direction,
the changing mechanism further comprises:
 a rotating mechanism configured to support the seat in such a manner that the seat is rotatable between the first direction and the second direction; and
 a fixing mechanism configured to fix the seat while the seat faces the first direction or the second direction,
the fixing mechanism comprises:
 a engagement groove extending around a rotation axis of the seat, the engagement groove defining at least one fixing portion extending toward the rotation axis of the seat at an end of the engagement groove; and
 a fixing operation tool manually operable to switch the seat between a fixed state where the fixing operation tool is engaged with the at least one fixing portion, and an unfixed state where the fixing operation tool is disengaged with the at least one fixing portion, and
the fixing operation tool is switched to the unfixed state when being moved away from the rotation axis of the seat.

2. The multipurpose vehicle according to claim 1, wherein:
the rotating mechanism is present under the seat, and
the rotary shaft is rotatable about a rotation axis extending in an up-down direction of the vehicle body.

3. The multipurpose vehicle according to claim 1, wherein:

the fixing operation tool is present at a laterally outer portion of the vehicle body both when the seat faces the first direction and when the seat faces the second direction.

4. The multipurpose vehicle according to claim 1, wherein:

the fixing mechanism is further configured to fix the seat while the seat faces a third direction between the first direction and the second direction.

5. The multipurpose vehicle according to claim 1, wherein:

the first direction is a front direction of the vehicle body, and the second direction is a laterally outward direction of the vehicle body.

6. The multipurpose vehicle according to claim 5, wherein:

while the seat faces the second direction, the seat is switchable between (i) a protruding state, in which the seat protrudes from the vehicle body laterally outward, and (ii) a retracted state, in which the seat is retracted in the vehicle body.

7. The multipurpose vehicle according to claim 1, further comprising:

a roll-over protective structure around the accommodating section, wherein:

the seat comprises a seat section and a backrest section, the seat is switchable between (i) a used state, in which the backrest section is present behind the seat section, and (ii) an unused state, in which the backrest section lies over the seat section so that a backrest surface of the backrest section faces the seat section, and when the seat is in the unused state, the backrest section covers the seat section entirely in a plan view.

8. The multipurpose vehicle according to claim 7, wherein:

the seat comprises a state switching mechanism configured to switch the seat between the used state and the unused state, and the state switching mechanism comprises a state switching operation tool manually operable to switch the seat from the used state to the unused state.

9. The multipurpose vehicle according to claim 8, wherein:

the state switching mechanism comprises:

a connecting member for the backrest section;

a rotation supporting member present at a back portion of the seat section and supporting the connecting member in such a manner that the connecting member is rotatable; and a rotary shaft present behind the seat section and rotatable about a rotation axis extending in a width direction of the seat.

10. The multipurpose vehicle according to claim 7, wherein:

when the seat is in the unused state, the backrest section is in contact with a seat surface of the seat section.

* * * * *